(12) United States Patent
Saitoh et al.

(10) Patent No.: US 12,397,810 B2
(45) Date of Patent: Aug. 26, 2025

(54) GETTING-OFF ASSISTANCE DEVICE FOR A VEHICLE

(71) Applicant: TOYOTA JIDOSHA KABUSHIKI KAISHA, Toyota (JP)

(72) Inventors: Noriyuki Saitoh, Nisshin (JP); Masaho Ishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 18/088,185

(22) Filed: Dec. 23, 2022

(65) Prior Publication Data

US 2023/0202502 A1 Jun. 29, 2023

(30) Foreign Application Priority Data

Dec. 27, 2021 (JP) ................................ 2021-212742

(51) Int. Cl.
*B60W 50/14* (2020.01)
*B60W 30/095* (2012.01)

(52) U.S. Cl.
CPC ........ *B60W 50/14* (2013.01); *B60W 30/0956* (2013.01); *B60W 2050/143* (2013.01);
(Continued)

(58) Field of Classification Search
CPC ............. B60W 50/14; B60W 30/0956; B60W 2050/143; B60W 2050/146; B60W 2420/403; B60W 2420/408; B60W 30/18054; B60W 2554/4041; B60W 2554/4044; B60K 28/12; B60Q 9/008; B60R 1/12; B60R 1/22; B60R 16/023; B60R 2001/1215; B60R 2001/1223; B60R 2001/1276; B60R 2300/802; E05F 15/42
See application file for complete search history.

(56) References Cited

U.S. PATENT DOCUMENTS 9,969,261 B2 5/2018 Kodama
10,045,173 B1 8/2018 Morimura et al.
(Continued)

FOREIGN PATENT DOCUMENTS

JP 2007-62641 A 3/2007
JP 2007-286898 A 11/2007
(Continued)

*Primary Examiner* — Brian A Zimmerman
*Assistant Examiner* — Cal J Eustaquio
(74) *Attorney, Agent, or Firm* — Sughrue Mion, PLLC

(57) ABSTRACT

A getting-off assistance device that includes a surrounding information acquisition device that acquires information about the surroundings of a vehicle and a control ECU that controls a notification device that notifies an alert to an occupant or occupants of the vehicle, and the control ECU is configured to start the notification of the alert when it is determined that it is dangerous for the occupant to get off the vehicle based on information acquired by the surrounding information acquisition device, end the notification of the alert when it is determined that it is no longer dangerous for the occupant to get off the vehicle, and change the alert so as to reduce annoyance of the alert given to the occupant or occupants when the number of times of the alerts after the door is finally opened is equal to or greater than a reference number of times.

6 Claims, 6 Drawing Sheets

(52) U.S. Cl.
CPC . *B60W 2050/146* (2013.01); *B60W 2420/403* (2013.01); *B60W 2420/408* (2024.01)

(56) References Cited

U.S. PATENT DOCUMENTS

| | | | |
|---|---|---|---|
| 10,086,833 B1* | 10/2018 | Duan | G01S 17/87 |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 2002/0161501 A1* | 10/2002 | Dulin | B60H 1/00735 |
| | | | 701/45 |
| 2009/0191803 A1* | 7/2009 | Barrette | B08B 15/02 |
| | | | 454/56 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2021/0254385 A1 | 8/2021 | Ishida et al. | |
| 2023/0202502 A1* | 6/2023 | Saitoh | B60K 28/12 |
| | | | 340/436 |

FOREIGN PATENT DOCUMENTS

| | | |
|---|---|---|
| JP | 2010-158990 A | 7/2010 |
| JP | 2014-085869 A | 5/2014 |
| JP | 2021-127595 A | 9/2021 |
| JP | 2021-128545 A | 9/2021 |

* cited by examiner

GETTING-OFF ASSISTANCE DEVICE FOR A VEHICLE

CROSS-REFERENCE TO RELATED APPLICATION

This application claims priority to Japanese Patent Application No. JP2021-212742 filed on Dec. 27, 2021, the content of which is hereby incorporated by reference in its entirety into this application.

BACKGROUND

1. Technical Field

The present disclosure relates to a getting-off assistance device for a vehicle such as an automobile.

2. Description of the Related Art

A getting-off assistance device for a vehicle such as an automobile has been known, which is configured to operate an alert notification device to notify an occupant or occupants of an alert when a door is opened and it is determined that it is dangerous for the occupant or occupants to get off the vehicle. For example, in Japanese Patent Application Laid-open No. 2014-085869, a getting-off assistance device is described that notifies an occupant or occupants of information about approaching of another vehicle by means of a speaker or the like when there is another vehicle approaching an own vehicle on the rear side of the own vehicle and a door of the own vehicle on the side where the other vehicle is approaching is open.

According to this type of getting-off assistance device, it is possible to improve the safety of the occupant or occupants when getting off the vehicle, compared to where the occupant or occupants are not notified of warning.

However, in the above-described conventional getting-off assist device, an alert is issued every time an object such as another vehicle approaches the own vehicle while a door of the own vehicle is open, so that in a situation where a plurality of vehicles approach and pass one after another, an occupant or occupants may feel annoyed by repeated alerts.

SUMMARY

The present disclosure provides an improved getting-off assistance device which can notify an occupant or occupants of an alert when getting off the vehicle is dangerous, and is improved so as to reduce the possibility that an occupant or occupants feel annoyed by alerts in a situation where a plurality of other vehicles approach and pass one after another.

The present disclosure provides a getting-off assistance device for a vehicle that includes an surrounding information acquisition device that acquires information about surroundings of an own vehicle, a notification device that notifies an alert to an occupant or occupants of the own vehicle, an open-door detection device that detects opening of a door, and an electronic control unit that controls the notification device, and the electronic control unit is configured to start the notification of the alert by the notification device when it is determined that it is dangerous for the occupant to get off the vehicle based on the information acquired by the surrounding information acquisition device in a situation where the open-door detection device detects that a door is open, and end the notification of the alert by the notification device when it is determined that it is no longer dangerous for the occupant to get off the vehicle based on the information acquired by the surrounding information acquisition device.

The electronic control unit is further configured to change the alert notified by the notification device so as to reduce annoyance of the warning given to the occupant or occupants when a number of times of the alerts notified by the notification device after the door is finally opened is equal to or greater than a reference number of times.

According to the present disclosure, when it is determined that it is dangerous for an occupant to get off the vehicle in a situation where the open-door detection device detects that a door is open, the notification of an alert is started and when it is determined that it is no longer dangerous for the occupant to get off the vehicle, the notification of the alert is ended. Further, when a number of times of the alert notified by the notification device after the door is finally opened is equal to or greater than a reference number of times, the alert notified by the notification device is changed so as to reduce annoyance of the alert given to the occupant or occupants.

Therefore, when it is dangerous for the occupant to get off the vehicle, it is possible to inform the occupant who is about to get off the vehicle of the danger by notifying the alert by the notification device. Furthermore, when the number of times of the alert notified after a door is finally opened is equal to or greater than the reference number of times, the annoyance of the alert given to the occupant or occupants is reduced, so that it is possible to reduce the possibility that the occupant or occupants will feel annoyed by the alert.

In one aspect of the present disclosure, the electronic control unit is further configured to start the notification of the alert by the notification device when, in a situation where the open-door detection device detects that a door is open, another vehicle approaching from behind or stopping on the same side as the open door is detected based on the information acquired by the surrounding information acquisition device and end the notification of the alert by the notification device when it is detected that the other vehicle has moved forward from the side of the own vehicle based on the information acquired by the surrounding information acquisition device.

According to the above configuration, the notification of the alert can be started when, in a situation where the open-door detection device detects that a door is open, another vehicle is approaching from behind or stopped on the same side as the open door is detected, and the notification of the alert can be ended when the other vehicle has moved forward from the side of the own vehicle. Therefore, in a situation where it is dangerous for the occupant to get off the vehicle due to another vehicle approaching or stopping, an alert can be notified.

In another aspect of the present disclosure, the electronic control unit is further configured to change the alert notified by the notification device so as to reduce annoyance of the alert given to the occupant or occupants by reducing an appeal of the alert to the occupant or occupants.

In general, the higher the appeal of the alert to the occupant or occupants, the higher the effect of alerting the occupant or occupants, but the more likely the occupant or occupants will feel annoyed by the alert. According to the above aspect, the alert notified by the notification device is changed so as to reduce the annoyance of the alert given to the occupant or occupants by reducing the appeal of the alert to the occupant or occupants.

In another aspect of the present disclosure, the alert notified by the notification device includes multiple types of alarms, and the electronic control unit is further configured to reduce the appeal of the alert to the occupant or occupants by reducing the number of alarms.

In general, the greater the number of types of alarms included in the alert is, the higher the appeal of the alert to the occupant or occupants is. According to the above aspect, by reducing the number of alarms, the appeal of the alert to the occupant or occupants is reduced. Therefore, before the number of times of the alert notified exceeds the reference number of times, all types of alarms are used to alert the occupant or occupants to the necessary alert, and after the number of times of alert notified reaches or exceeds the reference number of times, the appeal of the alert is reduced by reducing the number of alarms, so that it is possible to reduce the possibility that the occupant or occupants will feel annoyed by the alert.

Further, in another aspect of the present disclosure, the multiple types of alarms include an auditory alarm of voice utterance, and the electronic control unit is configured to reduce the appeal of the alert to the occupant or occupants by excluding the auditory alarm of voice utterance.

In general, the auditory alarm of voice utterance is more appealing to the occupant or occupants than an auditory alarm of non-voice utterance and visual alarm. According to the above aspect, the appeal of the alert to the occupant or occupants is reduced by excluding the auditory alarm of voice utterance. Therefore, before the number of times of the alert notified exceeds the reference number of times, all types of alarms are used to alert the occupant or occupants to the necessary alert, and after the number of times of alert notified reaches or exceeds the reference number of times, the appeal of the alert is reduced by excluding the auditory alarm of voice utterance, so that it is possible to reduce the possibility that the occupant or occupants will feel annoyed by the alert. Furthermore, the necessary alert can be more effectively provided than when all the auditory alarms are excluded.

Further, in another aspect of the present disclosure, the multiple types of alarms include at least one auditory alarm and at least one visual alarm, and the electronic control unit is configured to reduce the appeal of the alert to the occupant or occupants by excluding the auditory alarm.

In general, an auditory alarm is more appealing to the occupant or occupants than a visual alarm. According to the above aspect, by excluding the auditory alarm, the appeal of the alert to the occupant or occupants is reduced. Therefore, before the number of times of the alert notified exceeds the reference number of times, all types of alarms are used to alert the occupant or occupants to the necessary alert, and after the number of times of the alert notified reaches or exceeds the reference number of times, the appeal of the alert is reduced by excluding the auditory alarm, so that it is possible to reduce the possibility that the occupant or occupants will feel annoyed by the alert.

Notably, in the present application, the number of times of the alert notifications is counted as one from the start of the alert notification to the end of the alert notification in a situation where it is detected that a door is open. Further, the reference number of times may be a positive constant integer.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
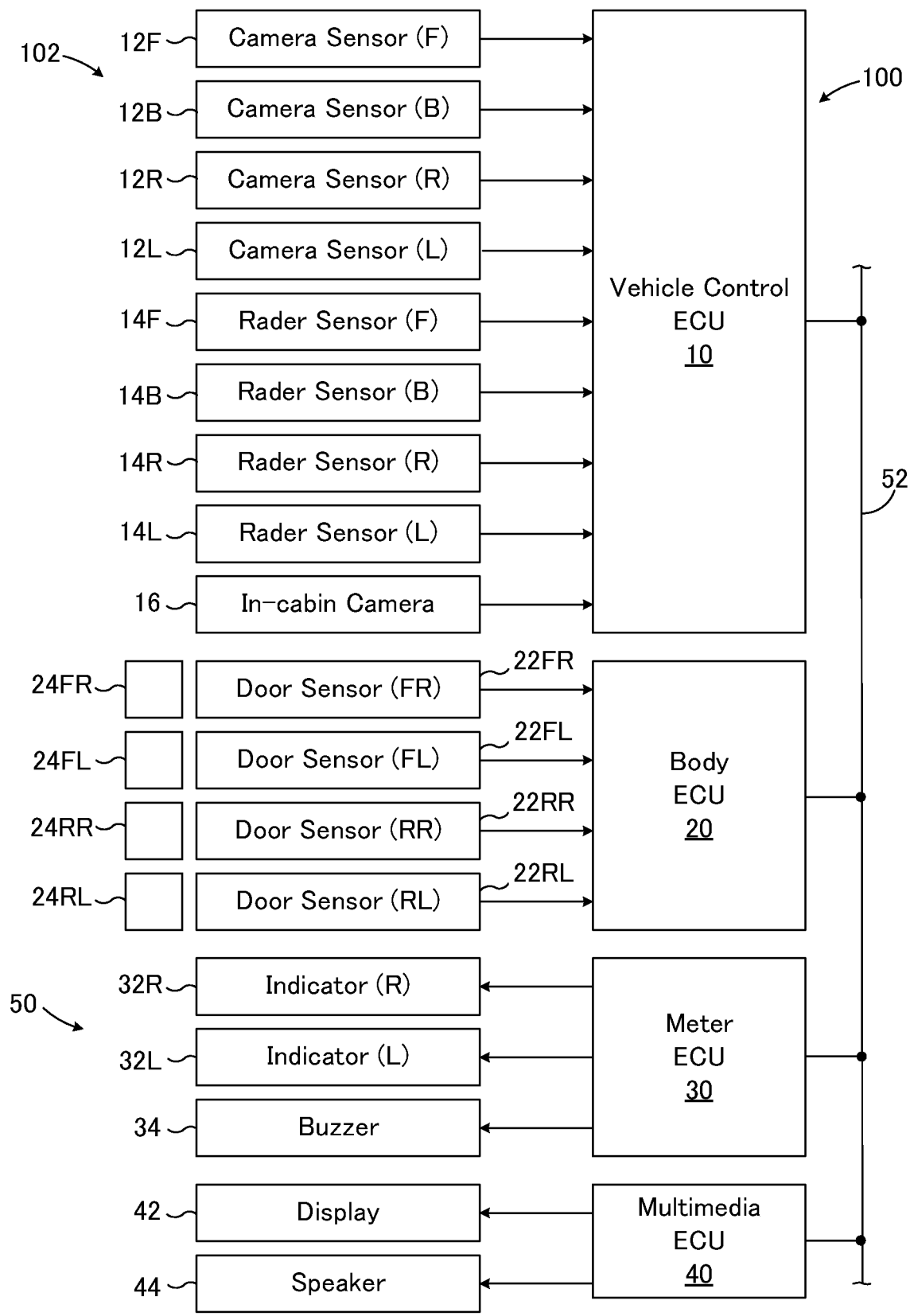
FIG. 1 is a schematic configuration diagram showing a first embodiment of a getting-off assistance device according to the present disclosure.

As shown in FIG. 1, the getting-off assistance device 100 according to the first embodiment is adapted to a vehicle 102 and includes a vehicle control ECU 10. The vehicle 102 may be a vehicle capable of autonomous driving, and includes a body ECU 20, a meter ECU 30, and a multimedia ECU 40. The ECU means an electronic control unit having a microcomputer as its main part. In the following description, the vehicle 102 will be referred to as own vehicle 102 as necessary to distinguish it from other vehicles.

Each microcomputer includes a CPU, ROM, RAM, non-volatile memory (N/M) and an interface (I/F). The CPU realizes various functions by executing instructions (programs, routines) stored in the ROM. Further, these ECUs are connected to each other via a CAN (Controller Area Network) 52 so as to be able to exchange data and communicate. Therefore, detected values of sensors (including switches) connected to a specific ECU are transmitted to other ECUs as well.

The vehicle control ECU 10 is connected with a plurality of camera sensors 12F, 12B, 12R and 12L and a plurality of radar sensors 14F, 14B, 14R and 14L. The plurality of camera sensors 12F, 12B, 12R and 12L are referred to as "camera sensors 12" when there is no need to distinguish between them. Similarly, the plurality of radar sensors 14F, 14B, 14R and 14L are referred to as "radar sensors 14" when there is no need to distinguish between them. The camera sensors 12 and the radar sensors 14 function as a surrounding information acquisition device that acquires information around the vehicle 102.

Each camera sensor 12, although not shown in the figure, comprises a camera unit and a recognition unit that analyzes image data obtained by photographing by the camera unit and recognizes targets such as road white lines and other vehicles. The recognition unit of each camera sensor 12 supplies information about the recognized target to the vehicle control ECU 10 every time a predetermined time elapses.

The camera sensor 12F is a front camera sensor that captures an image of the front of the vehicle 102, and the camera sensor 12B is a back camera that captures an image of the rear of the vehicle 102. The camera sensor 12R is a right side camera that captures an image of the right side of the vehicle 102, and the camera sensor 12L is a left side camera that captures an image of the left side of the vehicle 102.

Each radar sensor 14 includes a radar transmitting/receiving unit and a signal processor (not shown). The radar transmitting/receiving unit radiates radio waves in a millimeter wave band (hereinafter referred to as "millimeter waves") and receives millimeter waves (that is, reflected waves) reflected by three-dimensional objects (eg, other vehicles, bicycles, guardrails, etc.) existing within the radiation range. The signal processing unit supplies information representing a distance between the vehicle and the three-dimensional object (hereinafter referred to as surrounding information) to the vehicle control ECU 10 every time a predetermined time elapses based on a phase difference between the transmitted millimeter wave and the received reflected wave, an attenuation level of the reflected wave, and a time period from when the millimeter wave is transmitted to when the reflected wave is received. LiDAR (Light Detection And Ranging) may be used instead of the radar sensor 14.

The radar sensor 14F is provided at the front end of the vehicle 102 and acquires surrounding information in front of the vehicle. The radar sensor 14B is provided at the rear end portion of the vehicle 102 and acquires surrounding information behind the vehicle. The radar sensor 14R is provided on the right side of the vehicle 102 and acquires surrounding information on the right side of the vehicle. The radar sensor 14L is provided on the left side of the vehicle 102 and acquires surrounding information on the left side of the vehicle.

Furthermore, an in-cabin camera 16 is connected to the vehicle control ECU 10. Although not shown in FIG. 1, the in-cabin camera 16 is attached to a rearview mirror or a vehicle body in the vicinity thereof, and photographs an interior of the vehicle while swinging an optical axis to the left and right. The in-cabin camera 16 supplies the vehicle control ECU 10 with image information obtained by photographing, particularly information regarding the presence or absence of an occupant. If the vehicle 102 is equipped with a drive recorder device having a camera that captures 360-degree images of the exterior and interior of the vehicle, the in-cabin camera 16 may be the camera of the drive recorder device.

A plurality of door sensors 22FR, 22FL, 22RR and 22RL are connected to the body ECU 20. The door sensors 22FR, 22FL, 22RR and 22RL function as door opening detectors for detecting opening of a right front door 24FR, a left front door 24FR, a right rear door 24RR and a left rear door 24RL, respectively. The plurality of door sensors 22FR, 22FL, 22RR and 22RL are referred to as "door sensors 22" when there is no need to distinguish between them. The doors 24FR, 24FR, 24RR and 24RL are referred to as "doors 24" when there is no need to distinguish between them. Each door sensor 22 outputs a signal indicating that the corresponding door 24 is opened to the body ECU 20 and to the vehicle control ECU 10 via the CAN 52, when the corresponding door 24 is opened.

Indicators 32R and 32L and a buzzer 34 are connected to the meter ECU 30. The indicators 32R and 32L are installed on the right and left door mirrors, respectively, so as to be visible from inside the vehicle. The indicators 32R and 32L illuminate or blink when an actuation signal is output from the meter ECU 30 in response to an alert command transmitted from the vehicle control ECU 10, and issue a visual alarm. Indicators 32R and 32L are referred to as "indicators 32" when there is no need to distinguish between them. Further, the buzzer 34 sounds when a buzzer sounding signal is output from the meter ECU 30 in response to an alarm command transmitted from the vehicle control ECU 10, and issues an auditory alarm.

A display 42 and a speaker 44 are connected to the multimedia ECU 40. The multimedia ECU 40 displays an image on the display 42 according to a display command transmitted from the vehicle control ECU 10. The multimedia ECU 40 also causes the speaker 44 to issue a voice utterance alarm in accordance with a voice utterance command transmitted from the vehicle control ECU 10. Thus, display 42 provides a visual alert and speaker 44 provides an audible alert. Note that the speaker 44 may be, for example, a speaker of an audio device. Further, the display 42 may be, for example, a head-up display or a multi-information display that displays meters and various information, or may be a display of a navigation device.

The visual alarm displayed on the display 42 is preferably a visual alarm that gives specific dangerous information, such as "a vehicle is approaching from the right rear" or "there is a ditch on the left side of the vehicle". Also, the voice utterance alarm generated by the speaker 44 is preferably an audible alarm that notifies specific dangerous information such as "a vehicle is approaching from the right rear" or "there is an open ditch on the left side of the vehicle". It should be noted that the above voice utterance alarm generated by the speaker 44 is repeatedly notified at regular time intervals.

As can be seen from the above description, the indicator 32, buzzer 34, display 42 and speaker 44 function as an alert device 50 that issues visual and/or audible alarms. Although not shown in FIG. 1, an ECU such as the vehicle control ECU 10, the sensors such as the camera sensors 12, and the alert device 50 continue to be energized for a preset operation time (positive constant) from a time an ignition switch is turned off.

Figure 2:
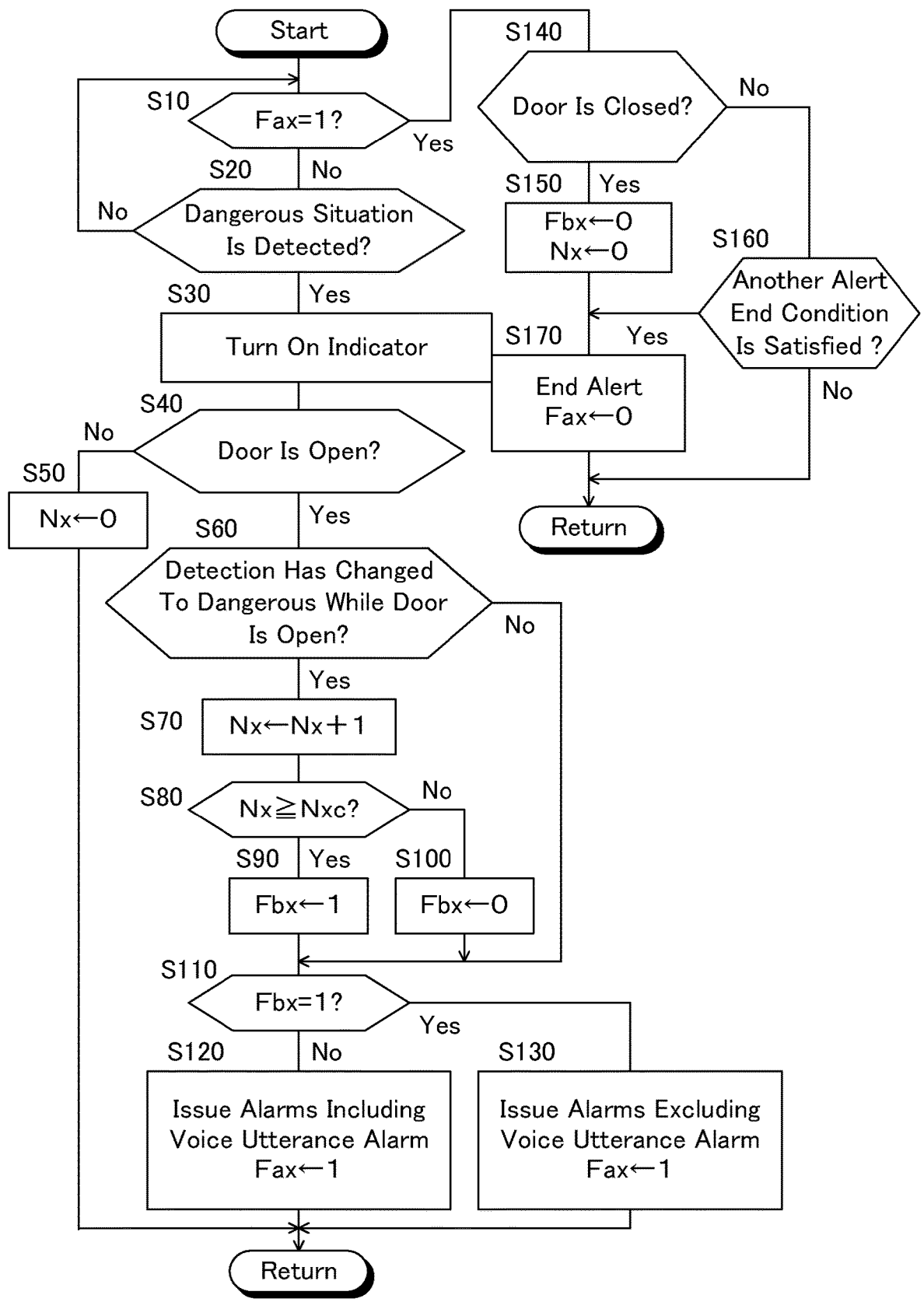
FIG. 2 is a flow chart showing a getting-off assistance control routine in the first embodiment.

In the first embodiment, the ROM of the vehicle control ECU 10 stores a getting-off assistance control program corresponding to the flowchart shown in FIG. 2 and the CPU executes the getting-off assistance control according to the program so that an occupant or occupants can safely get off the vehicle. That is, when the vehicle control ECU 10 determines that it is dangerous for the occupant or occupants to get off the vehicle based on the information around the vehicle 102 acquired by the camera sensors 12 and the radar sensors 14 and detects that a door is open, all the alarm devices such as the buzzer 34 are activated to issue all the alarms. The vehicle control ECU 10 may perform various vehicle controls known in the art, such as lane departure prevention control and collision damage mitigation control, while the vehicle 102 is running.

Getting-Off Assistance Control Routine in First Embodiment

Next, the getting-off assistance control routine in the first embodiment will be described with reference to the flowchart shown in FIG. 2. The getting-off assistance control according to the flowchart shown in FIG. 2 is started by the CPU of the vehicle control ECU 10 when an ignition switch (not shown in FIG. 1) is turned off. In addition, the getting-off assistance control is repeatedly executed at a predetermined control cycle in order of the surrounding conditions on the right side of the vehicle 102 and the right front door 24FR, the surrounding conditions on the left side of the vehicle and the left front door 24FL, the surrounding conditions on the right side of the vehicle and the right rear door 24RR, the surrounding conditions on the left side of the vehicle and the left rear door 24RL. In the following description, the getting-off assistance control is simply referred to as "present control".

Note that "x" of flags Fax and Fbx and a count value Nx of a counter, which will be described later, is "fr" when the getting-off assistance control is being executed for the surrounding situation on the right side of the vehicle 102 and the right front door 24FR and is "fl" when the control is being executed for the surrounding situation on the left side of the vehicle and the left front door 24FL. Note that "x" is "rr" when the getting-off assistance control is being executed for the surrounding situation on the right side of the vehicle 102 and the right rear door 24RR and is "rl" when the control is being executed for the surrounding situation on the left side of the vehicle and the left rear door 24RL. At the start of the getting-off assistance control, the flags Fax and Fbx and the count value Nx of the counter are reset to 0, respectively. These are the same for the second embodiment (FIG. 3) described later.

First, in step S10, the CPU determines whether or not the flag Fax is 1, that is, determines whether or not an alert has already been notified by the alert device 50 by executing step S120 or S130 described later. When the CPU makes an affirmative determination, the present control proceeds to step S140, and when it makes a negative determination, the present control proceeds to step S20.

In step S20, the CPU determines whether or not the camera sensor 12 and/or the radar sensor 14 detect a dangerous situation that occurs if an occupant gets off the vehicle. In this connection, as a dangerous situation, for example, it is determined on the right side of the vehicle 102 whether or not an object, such as another vehicle or a wild animal that may pass close to the vehicle 102 from the right rear or right front of the vehicle is detected. it is determined for the left side of the vehicle 102 whether or not an object that may pass close to the vehicle 102 from the left rear or left front of the vehicle, such as another vehicle such as a bicycle or motorcycle, or a wild animal is detected and whether a dangerous object, such as an uncovered ditch, is detected. When the CPU makes a negative determination, it once ends the present control, and when it makes an affirmative determination, it advances the present control to step S30.

In step S30, when the CPU determines in step S20 that a dangerous situation is detected on the right side of vehicle 102, it turns on the right indicator 32R. On the other hand, when the CPU determines in step S20 that a dangerous situation is detected on the left side of the vehicle 102, it turns on the left indicator 32L. When dangerous situations are detected on the right and left sides of the vehicle 102, the right and left indicators 32R and 32L are turned on.

In step S40, the CPU determines whether or not the corresponding door sensor 22 detects that the corresponding door 24 is open. When the CPU makes a negative determi-nation, it advances the present control to step S50, and when it makes an affirmative determination, it advances the present control to step S60.

In step S50, the CPU resets the count value Nx of the counter to 0, and then temporarily terminates the present control.

In step S60, the CPU determines whether or not the determination in step S20 has changed from a negative determination to an affirmative determination while the corresponding door sensor 22 detects that the corresponding door 24 is open. When the CPU makes a negative determination, the present control advances to step S110, and when it makes an affirmative determination, that is, when a dangerous situation that occurs if an occupant gets off the vehicle changes from not being detected to being detected, the count value Nx of the counter is incremented by one in step S70.

In step S80, the CPU determines whether or not the count value Nx of the counter is greater than or equal to a reference count Nxc. When the CPU makes a affirmative determination, it sets the flag Fbx to 1 in step S90, and when the CPU makes a negative determination, it resets the flag Fbx to 0 in step S100. Note that the reference count Nxc may be a constant positive integer.

In step S110, the CPU determines whether or not the flag Fbx is 1, ie, whether or not voice utterance alarm should be excluded from the alert. When the CPU makes an affirmative determination, the present control proceeds to step S130, and when the CPU makes a negative determination, the present control proceeds to step S120.

In step S120, the CPU outputs command signals to the meter ECU 30 and the multimedia ECU 40 so that all the alarms including voice utterance alarm are issued. In this step, the indicator 32 is changed from lighting to blinking. Also, the CPU sets the flag Fax to one.

In a situation where one of the front door and the rear door on the same side of the vehicle 102 is already open, when the other of the front door and the rear door is opened, since all the alarms or the alarms excluding the voice utterance alarm are already issued, only the flag Fax is set to 1 for the other door.

In step S130, the CPU outputs command signals to the meter ECU 30 and the multimedia ECU 40 so that all the alarms other than the voice utterance alarm are issued. Also in this step, the corresponding indicator 32 is changed from lighting to blinking. Also, the CPU sets the flag Fax to one.

Note that when all the alarms have been issued for both the left and right sides of the vehicle 102, the voice utterance alarm is excluded only for the side for which the affirmative determination was made in step S80. However, at this timing, the voice utterance alarm may be excluded for both the left and right sides of the vehicle 102.

In step S140, the CPU determines whether the door sensor 22 has detected that the corresponding door 24 is closed. When the CPU makes a negative determination, it advances the present control to step S160, and when the CPU makes an affirmative determination, it resets the flag Fbx and the count value Nx of the counter to 0 in step S150.

In step S160, the CPU determines whether or not an alert end condition other than closing of the door 24 is satisfied. When the CPU makes a negative determination, it once ends the present control, and when the CPU makes an affirmative determination, it advances the present control to step S170. In this connection, when any one of the following conditions E1 to E3 is satisfied, it is determined that the alert end condition other than closing of the door is satisfied.

E1: The camera sensor 12 and the radar sensor 14 stopped detecting a dangerous situation generated when an occupant got off the vehicle.

E2: There is no occupant detected by the in-cabin camera 16. That is, all occupants got off the vehicle.

E3: A preset control time (positive constant) has elapsed since the alert was initiated.

In step S170, the CPU terminates issuing of all the alarms and resets the flag Fax to zero. When the condition E2 or E3 is satisfied, the power supply to the ECUs such as the vehicle control ECU 10, the sensors such as the camera sensors 12, and the alert device 50 may be terminated.

In addition, when one of the front door and the rear door is closed in a situation where both the front door and the rear door on the same side of the vehicle 102 are open, the alert notification is maintained, and the flag Fbx and the count value Nx of the counter may be reset for the one of the doors.

Example of Operation of First Embodiment

Next, the operation of the first embodiment will be described with reference to FIGS. 4 to 6, taking as an example a case where another vehicle approaches from the right rear of the vehicle 102 and passes on the right side.

Figure 4:
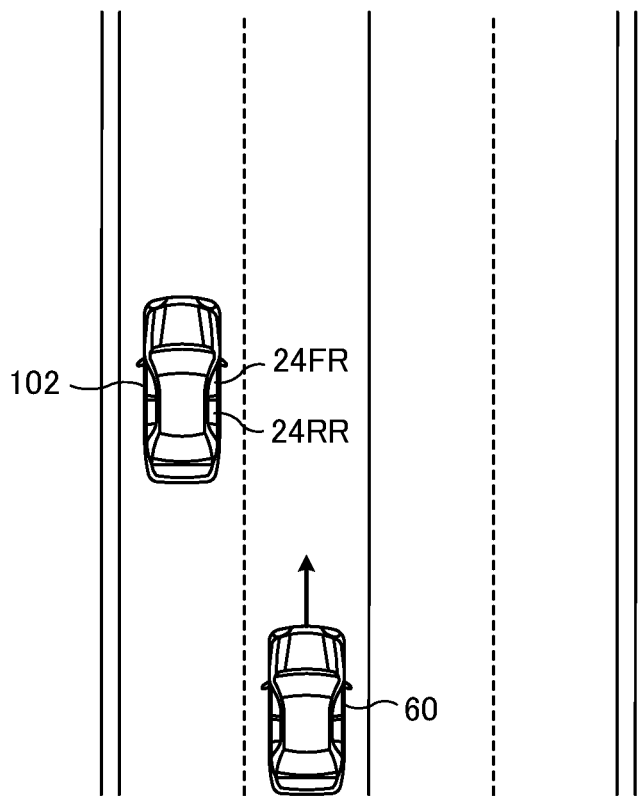
FIG. 4 shows a situation in which another vehicle is approaching from the right rear of a own vehicle, and neither the right front door nor the right rear door is open.

FIG. 4 shows a situation in which another vehicle 60 is approaching from the right rear of the own vehicle 102, and neither the right front door 24FR nor the right rear door 24RR is open. In this situation, a negative determination is made in step S10 and an affirmative determination is made in step S20, so that right indicator 32R is lit up in step S30. Further, a negative determination is made in step S40. Therefore, an occupant or occupants can recognize the danger of opening the right side door or doors and getting off the vehicle because the indicator 32R is lit.

Figure 5:
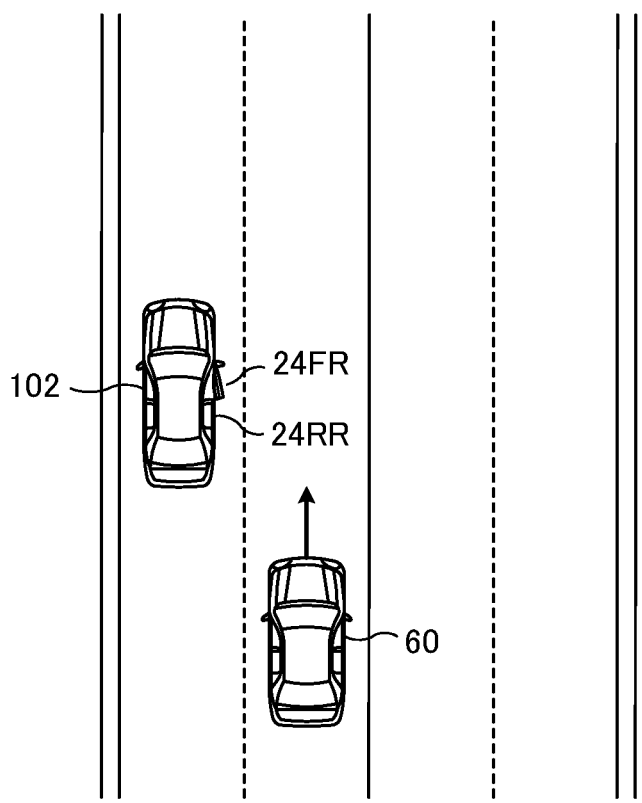
FIG. 5 shows a situation in which another vehicle is approaching from the right rear of the own vehicle and the right front door is slightly open.

FIG. 5 shows a situation in which another vehicle 60 is approaching from the right rear of the own vehicle 102 and the right front door 24FR is slightly opened. In this situation, affirmative determinations are made in steps S20, S40 and S60, so that the count value Nx of the counter is counted up to 1 in step S70. Assuming that the reference count Nxc is 2, a negative determination is made in step S80, and the flag Fbx is reset to 0 in step S100. Therefore, since a negative determination is made in step S110, all the alarms including the voice utterance alarm are issued in step S120. Thus, a driver can stop opening the front door 24FR any further to get off the vehicle, thereby avoiding the danger of the other vehicle 60 colliding with the driver and the front door 24FR.

In this situation, when the right front door 24FR is closed, affirmative determinations are made in steps S10 and S140, so that in S170, the issuing of all the alarms is terminated, and the flag Fax and the like are reset to zero. Therefore, the occupant or occupants do not feel annoyed by the alert.

Figure 6:
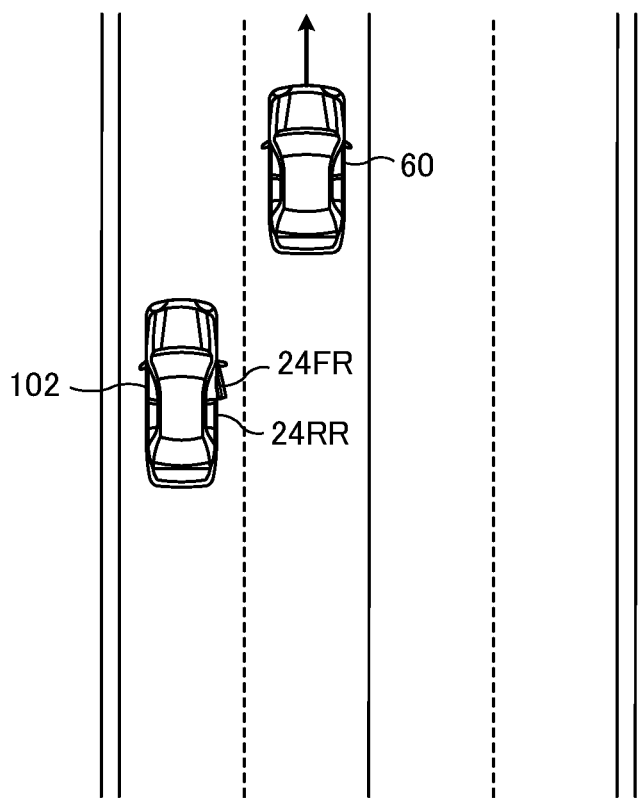
FIG. 6 shows a situation in which the other vehicle has passed the right side of the own vehicle and moved to the right front of the own vehicle.

FIG. 6 shows a situation in which the right front door 24FR remains slightly open, and the other vehicle 60 passes the right side of the own vehicle 102 and moves to the right front of the own vehicle 102. In this situation, when the other vehicle 60 passes on the right side of the own vehicle 102 and the condition E1 is satisfied, that is, when the camera sensors 12 and the radar sensors 14 no longer detect a dangerous situation even if the occupant gets out of the vehicle, the determination in S160 becomes an affirmative determination. Therefore, even if the right front door 24FR is closed, all the alarms are terminated so that the driver can get out of the vehicle with security.

Figure 7:
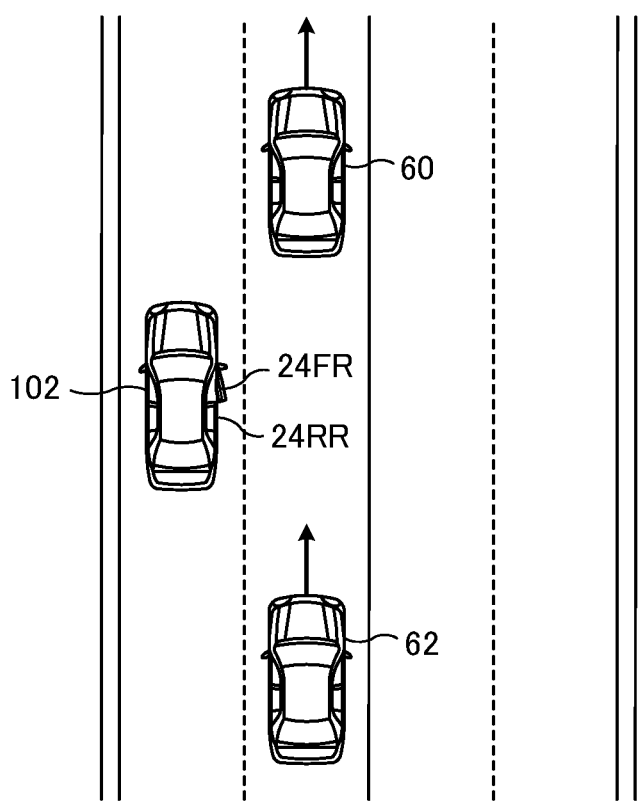
FIG. 7 shows a situation in which the right front door is slightly open and another vehicle is approaching from the right rear of the own vehicle.

FIG. 7 shows a situation in which the right front door 24FR remains slightly open and another vehicle 62 is approaching the own vehicle 102 from the right rear. In this situation, as in the case shown in FIG. 5, affirmative determinations are made in steps S20, S40 and S60, so the count value Nx of the counter is counted up to 2 in step S70. Assuming that the reference count Nxc is 2, an affirmative determination is made in step S80, and the flag Fbx is set to 1 in step S90. Therefore, since an affirmative determination is made in step S110, the alarms other than the voice utterance alarm are issued in step S130. Thus, the driver can stop opening the front door 24FR any further to get off the vehicle, thereby avoiding the risk of the other vehicle 60 colliding with the driver and the front door 24FR, and furthermore, it is possible to reduce a possibility that the occupant or occupants will feel annoyed by the alert.

Although not shown in the drawings, even when another vehicle such as a motorbike passes on the left side of the own vehicle 102, the getting-off assist device 100 works the same as that shown in FIGS. 4 to 7.

Figure 8:
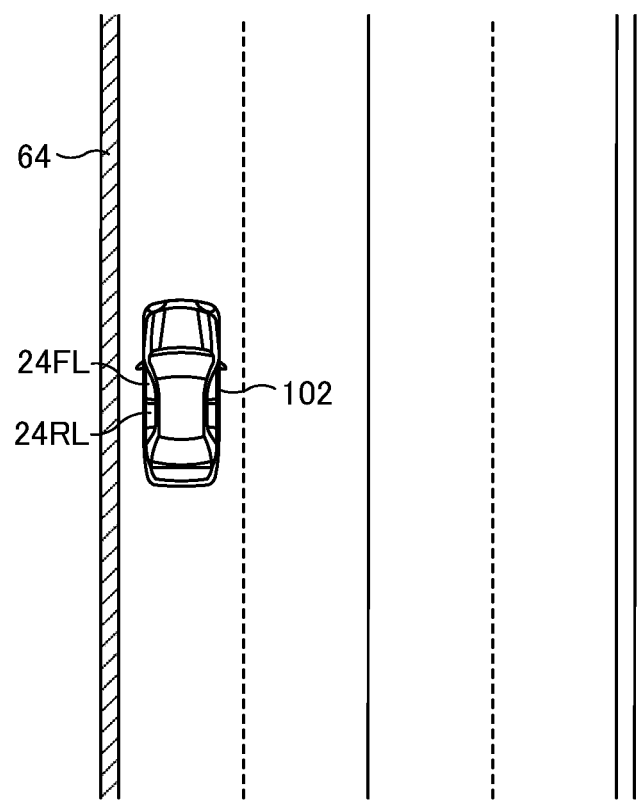
FIG. 8 shows a situation where there is an immovable object on the left side of the vehicle, such as a ditch without lids, which makes getting off the vehicle dangerous.

In addition, as shown in FIG. 8, when there is an immovable object such as a side ditch 64 without lids on the left side of the vehicle 102, which makes it dangerous to get off the vehicle, the condition E1 is not satisfied so that the alert end condition is not satisfied. Therefore, when an immobile object that makes getting off the vehicle dangerous is detected in step S20, the alert issued in steps S120 and S130 may include information recommending that the occupant or occupants get off the vehicle from the left side of the vehicle at another safe place. Incidentally, in the case shown in FIG. 8, the condition for terminating the alarms is satisfied when the condition E3 is satisfied, so that the alert does not continue for an excessively long time.

Second Embodiment

Figure 3:
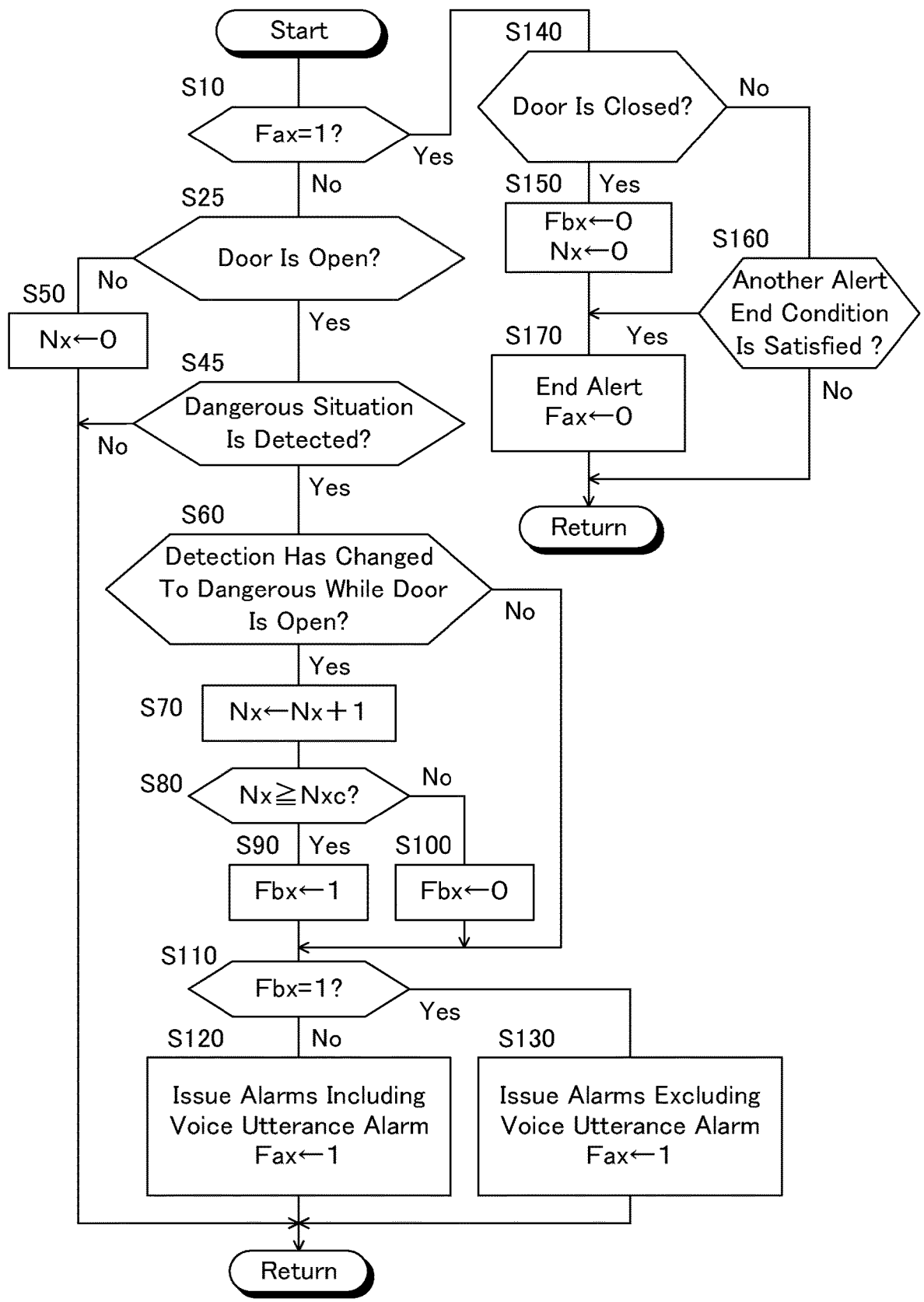
FIG. 3 is a flow chart showing a getting-off assistance control routine in the second embodiment.

The getting-off assistance device 100 according to the second embodiment of the present invention is configured in the same manner as the getting-off assistance device according to the first embodiment, and the CPU of the vehicle control ECU 10 performs the getting-off assistance control according to the flowchart shown in FIG. 3.

Getting-Off Assistance Control Routine in Second Embodiment

Next, the getting-off assistance control routine in the second embodiment will be described with reference to the flowchart shown in FIG. 3. In FIG. 3, steps that are the same as those shown in FIG. 2 are given the same step numbers as the step numbers given in FIG. 2.

In the second embodiment, in step S10, the CPU determines whether or not the flag Fax is 1 as in the first embodiment. When an affirmative determination is made, the present control proceeds to step S140, and when a negative determination is made, the present control proceeds to step S25.

In step S25, the CPU determines whether or not opening of the corresponding door 24 is detected by the corresponding door sensor 22, as in step S40 in the first embodiment. When the CPU makes a negative determination, it advances the present control to step S50, and when the CPU makes an affirmative determination, it advances the present control to step S45.

In step S45, the CPU determines whether or not the camera sensor 12 and/or the radar sensor 14 detect a dangerous situation that occurs if the occupant gets out of the vehicle, as in step S20 in the first embodiment. When the CPU makes a negative determination, it once ends the present control, and when the CPU makes an affirmative determination, it advances the present control to step S60.

As can be seen from a comparison of FIGS. 3 and 2, steps S50 through S170 are performed in the same manner as steps S50 through S170 in the first embodiment, respectively. Therefore, description of these steps is omitted.

In the second embodiment, step S30 of the first embodiment is not executed. Therefore, the getting-off assistance device of the second embodiment works the same as the getting-off assistance device of the first embodiment, except that the indicator 32 is not lit even if a dangerous situation that occurs when the occupant gets off the vehicle is detected by the camera sensors 12 and/or the radar sensors 14. Note that the indicator 32 may be lit or blinked in steps S120 and S130.

As can be seen from the above description, according to the first and second embodiments, when it is determined that it is dangerous for an occupant to get off the vehicle (S20, S45) and opening of a door is detected (S40, S25), the alert device 50 such as the indicator 32 issues alarms including an auditory alarm of voice utterance (S120). However, when the number of times Nx of alert notifications reaches or exceeds the reference number of times Nxc (S80), the voice utterance alarm is excluded from a plurality of types of alarms to be issued, and the degree of appeal of the alert is reduced, whereby the alert notified by the alert device 50 is changed so as to reduce the annoyance of the alert given to the occupants (S130).

Therefore, before the number of times Nx of alarm notifications reaches or exceeds the reference number of times Nxc, it is possible to ensure the appeal of the alert by the alarms including the auditory alarm of voice utterance to a necessary level and necessary alerting can be performed to the occupant or occupants. In addition, after the number of times Nx of alert notifications has reached or exceeded the reference number of times Nxc, since the appeal of the alert is reduced by excluding the voice utterance alarm, it is possible to reduce the possibility that the occupant or occupants will feel annoyed by the alert.

In addition, according to the first and second embodiments, when the number of times Nx of alert notifications reaches or exceeds the reference number of times Nxc, the alarm of voice utterance is excluded from the plurality of types of alarms to be issued. Therefore, by reducing the number of alarms, excluding audio utterance alarm with high alerting appeal among the auditory alarms, and excluding one auditory alarm, the appeal of the alert can be effectively reduced.

Furthermore, according to the first and second embodiments, when the number of times Nx of alert notifications reaches or exceeds the reference number of times Nxc, the voice utterance alarm is excluded from the plurality of types of alarms to be issued, but an audible alarm by the buzzer 34 which is a non-voice utterance auditory alarm is not excluded. Therefore, compared to where all auditory alarms are excluded, necessary alerting can be performed effectively.

In particular, according to the first embodiment, it is first determined whether or not a dangerous situation that occurs if the occupant gets off the vehicle is detected (S20), and when a dangerous situation is detected, the indicator 32 is turned on. Therefore, before the occupant opens the door 24, he or she can be alerted that there is a dangerous situation if he or she gets off the vehicle.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, the alarms include an auditory alarm of voice utterance, and when the number of times Nx of alerts reaches or exceeds the reference number of times Nxc, the alarm of voice utterance is excluded, thereby reducing the appeal of the alert. However, the reduction in appeal of the alert may be achieved by increasing the time interval between voice utterances, or the appeal of the alert may be reduced by excluding all auditory alarms. In addition, the auditory alarms may not include the auditory alarm of voice utterance. In that case, when the number of alert notifications Nx reaches or exceeds the reference number of times Nxc, the appeal of the alert may be reduced by excluding audible alarms.

Further, in the above-described first and second embodiments, the appeal of the alert is also reduced by reducing the number of alarms by excluding voice utterance alarm. However, the appeal of the alert may be reduced by changing the mode of one or more types of alarms. For example, for an auditory alarm, the appeal of the alert may be reduced by reducing a volume, lowering a frequency, etc. In particular, for the alarm issued by the buzzer 34, in addition to the above manners, the appeal of the alert may be reduced by increasing an intermittent time interval of the buzzer sound. As for the visual alarm, the appeal of the alert may be reduced by decreasing a size of a text alarm, increasing a display time interval of the text alarm, or decreasing a brightness or luminance of the alarm.

Further, in the above-described first and second embodiments, determination as to whether or not the alert termination condition E2 is satisfied is performed based on image information acquired by photographing by the in-cabin camera 16. However, in a vehicle in which each seat is provided with a seat sensor, the determination as to whether the condition E2 is satisfied may be made based on the detection results of the seat sensors.

Further, in the above-described first and second embodiments, the alerts include visual and audible alerts, but one of the visual and audible alerts may be omitted. Conversely, the alerts may include tactile alerts, such as seat vibrations, in addition to visual and audible alerts.

Further, in the above-described first and second embodiments, when it is determined in step S160 that the condition E3 is satisfied, all the alarms are terminated in step S170. However, when it is determined in step S160 that the first control time (positive constant) has elapsed from a time point when the alert was started, the control may proceed to step S130 where voice utterance alarm is excluded, and when it is determined in step S160 that the second control time (positive constant greater than the first control time) has elapsed from the time point when the alert was started, the control may proceed to step S170. According to this modification, it is possible to reduce the possibility that an occupant or occupants may feel annoyed by the alert even when a plurality of objects sequentially approach and pass through the own vehicle without leaving an interval.

Further, in the above-described first and second embodiments, the getting-off assistance control according to the flowcharts shown in FIGS. 2 and 3 is started by the CPU of the vehicle control ECU 10 when the ignition switch is turned off. However, the getting-off assistance control according to the flowcharts shown in FIGS. 2 and 3 may also be executed when the ignition switch is on and the vehicle is stopped.

Further, in the above-described first embodiment, when it is determined in step S20 that a dangerous situation is detected when an occupant gets off the vehicle, the indicator 32 is turned on in step S30. However, step S30 may be omitted.

What is claimed is:

1. A getting-off assistance device for a vehicle that includes a surrounding information acquisition device that acquires information about surroundings of an own vehicle, a notification device that notifies an alert to an occupant or occupants of the own vehicle, an open-door detection device that detects opening of a door, and an electronic control unit that controls the notification device, and the electronic control unit is configured to start notification of the alert by the notification device when it is determined that it is dangerous for the occupant or occupants to get off the vehicle based on the information acquired by the surrounding information acquisition device in a situation where the open-door detection device detects that a door is open, and end the notification of the alert by the notification device when it is determined that it is no longer dangerous for the occupant or occupants to get off the vehicle based on the information acquired by the surrounding information acquisition device, wherein the electronic control unit is further configured to change the alert notified by the notification device so as to reduce annoyance of the alert given to the occupant or occupants when a number of times of the alerts notified by the notification device during a situation where the door is open after the door is finally opened is equal to or greater than a reference number of times, and the electronic control unit is further configured to terminate the notification of the alert by the notification device and reset the number of times of the alerts to zero when the door-open detection device detects that the door has been closed.

2. The getting-off assistance device for a vehicle according to claim 1, wherein the electronic control unit is further configured to start the notification of the alert by the notification device when, in a situation where the open-door detection device detects that a door is open, another vehicle approaching from behind or stopping on the same side as the open door is detected based on the information acquired by the surrounding information acquisition device and end the notification of the alert by the notification device when it is detected that an other vehicle has moved forward from the side of the own vehicle based on the information acquired by the surrounding information acquisition device.

3. The getting-off assistance device for a vehicle according to claim 1, wherein the electronic control unit is further configured to change the alert notified by the notification device so as to reduce annoyance of the alert given to the occupant or occupants by reducing an appeal of the alert to the occupant or occupants.

4. The getting-off assistance device for a vehicle according to claim 3, wherein the alert notified by the notification device includes multiple types of alarms, and the electronic control unit is further configured to reduce the appeal of the alert to the occupant or occupants by reducing a number of alarms.

5. The getting-off assistance device for a vehicle according to claim 4, wherein the multiple types of alarms include an auditory alarm of voice utterance, and the electronic control unit is configured to reduce the appeal of the alert to the occupant or occupants by excluding the auditory alarm of voice utterance.

6. The getting-off assistance device for a vehicle according to claim 4, wherein the multiple types of alarms include at least one auditory alarm and at least one visual alarm, and the electronic control unit is configured to reduce the appeal of the alert to the occupant or occupants by excluding the auditory alarm.

* * * * *